US008517088B2

(12) United States Patent
Moore et al.

(10) Patent No.: US 8,517,088 B2
(45) Date of Patent: Aug. 27, 2013

(54) RAPID PROGRAMMING OF THERMOSTAT WITH MULTIPLE PROGRAMMING MODE CONDITIONS

(75) Inventors: Glenn A. Moore, Geneva, IL (US); Daniel S. Poplawski, Oswega, IL (US); Robert M. Rados, Yorkville, IL (US)

(73) Assignee: Braeburn Systems, LLC, Montgomery, IL (US)

( * ) Notice: Subject to any disclaimer, the term of this patent is extended or adjusted under 35 U.S.C. 154(b) by 228 days.

(21) Appl. No.: 13/045,370

(22) Filed: Mar. 10, 2011

(65) Prior Publication Data

US 2012/0232703 A1 Sep. 13, 2012

(51) Int. Cl.
*G05D 23/19* (2006.01)
*G05D 23/00* (2006.01)

(52) U.S. Cl.
USPC ............ 165/238; 165/254; 700/299; 700/300

(58) Field of Classification Search
USPC ..... 700/17–18, 276–278, 299–300; 165/238, 165/254; 236/1 C, 91 D, 91 E, 91 R, 94; 715/700–702
See application file for complete search history.

(56) References Cited

U.S. PATENT DOCUMENTS

| | | | | |
|---|---|---|---|---|
| 6,595,430 | B1 * | 7/2003 | Shah | 236/46 R |
| 7,156,317 | B1 * | 1/2007 | Moore | 236/49.3 |
| 7,274,972 | B2 * | 9/2007 | Amundson et al. | 700/276 |
| 7,438,469 | B1 | 10/2008 | Moore | |
| 7,614,567 | B2 * | 11/2009 | Chapman et al. | 236/1 C |
| 7,636,604 | B2 * | 12/2009 | Bergman et al. | 700/17 |
| 7,784,705 | B2 * | 8/2010 | Kasper et al. | 236/44 C |
| 7,801,646 | B2 * | 9/2010 | Amundson et al. | 700/276 |
| 7,861,941 | B2 * | 1/2011 | Schultz et al. | 236/1 C |
| 7,867,646 | B2 * | 1/2011 | Rhodes | 429/100 |
| 8,083,154 | B2 * | 12/2011 | Schultz et al. | 236/94 |
| 8,167,216 | B2 * | 5/2012 | Schultz et al. | 236/51 |
| 8,219,251 | B2 * | 7/2012 | Amundson et al. | 700/276 |
| 8,244,383 | B2 * | 8/2012 | Bergman et al. | 700/17 |
| 8,280,536 | B1 * | 10/2012 | Fadell et al. | 700/83 |
| 8,346,396 | B2 * | 1/2013 | Amundson et al. | 700/276 |
| 2004/0133314 | A1 * | 7/2004 | Ehlers et al. | 700/276 |

(Continued)

OTHER PUBLICATIONS

Honeywell International Inc., VisionPRO TH8000 Series. Touchscreen Programmable Thermostat Opening Manual, 2009.

(Continued)

*Primary Examiner* — Ramesh Patel
(74) *Attorney, Agent, or Firm* — Arnstein & Lehr LLP

(57) ABSTRACT

The invention provides for a controller such as a thermostat for an HVAC System comprising a housing having a circuit board and a display screen, the display screen having at least one alpha-numeric icon and a group of input control areas. A microprocessor is provided for control on the display screen. Buttons are pressed in order to program set-points of the thermostat so that seven days may be programed simultaneously. The display includes a seven-day icon so that the user can program the thermostat set-points rapidly (e.g. setting time and temperature settings with minimal steps). The user may activate a first programming mode wherein the activating occurs by depressing a programming-mode button for a first pre-selected duration in order to select a first day for setting the conditioning mode. The user may activate a second programming mode wherein such activating occurs by depressing the programming-mode button for a second pre-selected duration that is longer than the first pre-selected duration in order to select programming for all seven days simultaneously.

17 Claims, 4 Drawing Sheets

(56) References Cited

U.S. PATENT DOCUMENTS

| | | | |
|---|---|---|---|
| 2004/0193324 A1* | 9/2004 | Hoog et al. | 700/276 |
| 2004/0256472 A1* | 12/2004 | DeLuca | 236/46 R |
| 2005/0033707 A1* | 2/2005 | Ehlers et al. | 705/412 |
| 2012/0168524 A1* | 7/2012 | Moore et al. | 236/1 C |
| 2012/0169675 A1* | 7/2012 | Moore et al. | 345/184 |

OTHER PUBLICATIONS

PRO1 IAO, True Comfort IIII Model T955 Operating Manual, 2010.

White Rodgers, Big Blue Humidity Universal Thermostat, Model 1F95-1291 Instructions (admitted prior art).

* cited by examiner

RAPID PROGRAMMING OF THERMOSTAT WITH MULTIPLE PROGRAMMING MODE CONDITIONS

The present invention pertains to a display and method for rapid programming of a thermostat in order to control multiple functions of an HVAC system controlled by the thermostat.

BACKGROUND

Thermostats typically have multiple functions that require user input, such as setting time of day, day of week, programming temperature set points or programming user settings. Control panels typically include an assortment of buttons for operating the thermostat and adjusting the settings. Adjustment of the thermostat settings using the assortment of buttons can often times be confusing to the user, require detailed review of user manual and consume much time in order to properly operate the thermostat and adjust the settings to the user's liking.

In some cases a liquid crystal display (LCD) may be provided that includes touch sensitive areas populated on the display screen. The touch sensitive area may include numerals, word phrases or graphics (collectively, "icons") that appear on the display screen. By touching the appropriate icon, the user can make adjustments to the functioning of the thermostat and activate specific modes of operation or make setting adjustments. Some thermostats are known to have mechanical buttons or switches ("hard buttons"). Such hard buttons are commonly used in combination with touch sensitive areas ("soft buttons") on a LCD. Some thermostats have multiple hard buttons on different portions of the thermostat housing. Typically the user must program the thermostat by using the soft or hard buttons to adjust set-points (e.g. time and corresponding temperature) for each day of the week. The process of programming is typically repeated seven times so that the proper set-points are programmed for each weekday and weekend day. When programming includes setting hour, minute, temperature and fan settings: the total number steps and inputs required to complete the programming for seven days may exceed 100 steps. The present invention overcomes many of the above mentioned disadvantages of previously known thermostats and allows for more rapid programming of the thermostat.

SUMMARY

The present invention provides for a method for programming a thermostat comprising the steps of providing a thermostat having a display and buttons for controlling at least two modes of a thermostat, including a heating mode and a cooling mode and a thermostat capable of controlling the heating and cooling modes for each of seven days, activating a first programming mode in order to select all seven days simultaneously, displaying a seven day icon on the display during the heating mode selection, activating a second programming mode in order to select all seven days for the cooling mode for all seven days simultaneously, and displaying the seven day icon on the display during the cooling mode selection.

In an embodiment, the buttons may be mechanical buttons disposed on a housing of the thermostat. In an embodiment, the buttons may be touch sensitive areas displayed on a display screen of the thermostat. In an embodiment, the buttons may be a combination of a mechanical button and a touch sensitive area button. In an embodiment, a mechanical button may be a rocker switch.

In an embodiment, the method may comprise the step of selecting the temperature and duration for a fractional day period, such as a morning period, a daytime period, an evening period, a night period, occupied period or unoccupied period. In an embodiment, the method may further comprise the step of selecting a fan setting.

The present invention may further comprise a thermostat display for programming a thermostat comprising a thermostat including a system button and a program button, a display screen including a seven day icon, a temperature icon and a time icon, wherein activation of the program button selects the seven day icon and activation of the system button provides for selection of one of a heat mode and a cool mode and for programming all seven days simultaneously for one of the modes by adjustment of the temperature and time icons.

In an embodiment, the seven day icon may comprise an alpha-numeric representation of each of the seven days of the week. In an embodiment, the icon may comprise "M TU W TH F SA SU." In an embodiment, the temperature and time icons may comprise an alpha-numeric representation. In an embodiment, a rocker switch may be provided for adjusting set points for temperature and time of the modes. In an embodiment, a fan button may be provided for selecting a fan mode for the heat and cool modes.

In an embodiment, the program button may include a pre-determined time trigger so that pressing the program button for a period of time greater than the pre-determined time trigger results in activation of a seven day programming mode and pressing the program button for a period of time less than the predetermined time trigger results in activation of an individual day programming mode. In an embodiment, the system button and program button may be touch sensitive areas displayed on the display screen of the thermostat.

The present invention may also provide for a computer readable media having stored thereon computer executable instructions for programming a thermostat, the instructions, when executed by a computing device, perform the steps comprising displaying a system button, displaying a program button, displaying a seven day icon, displaying a time icon, displaying a temperature icon, selecting the seven day icon upon activation of the program button, selecting one of the heat mode or cool mode upon activation of the program button and simultaneously programming seven days for the heat mode or cool mode by adjusting set points via the time and temperature icons.

In an embodiment, the seven day program may comprise an alpha numeric representation of each of the seven days of a week. In an embodiment, the time and temperature icons may comprise an alpha-numeric representation. In an embodiment, a rocker switch for adjusting the set points for temperature and time modes may be provided for a period. In an embodiment, the complete programming of the seven days for the heating or cooling may be provided without requiring an increment from a first day to a second day during user input to program the thermostat.

BRIEF DESCRIPTION OF THE DRAWINGS

For a better understanding of the subject invention, reference may be had to embodiments shown in the attached drawings in which.

DETAILED DESCRIPTION

Figure 1:
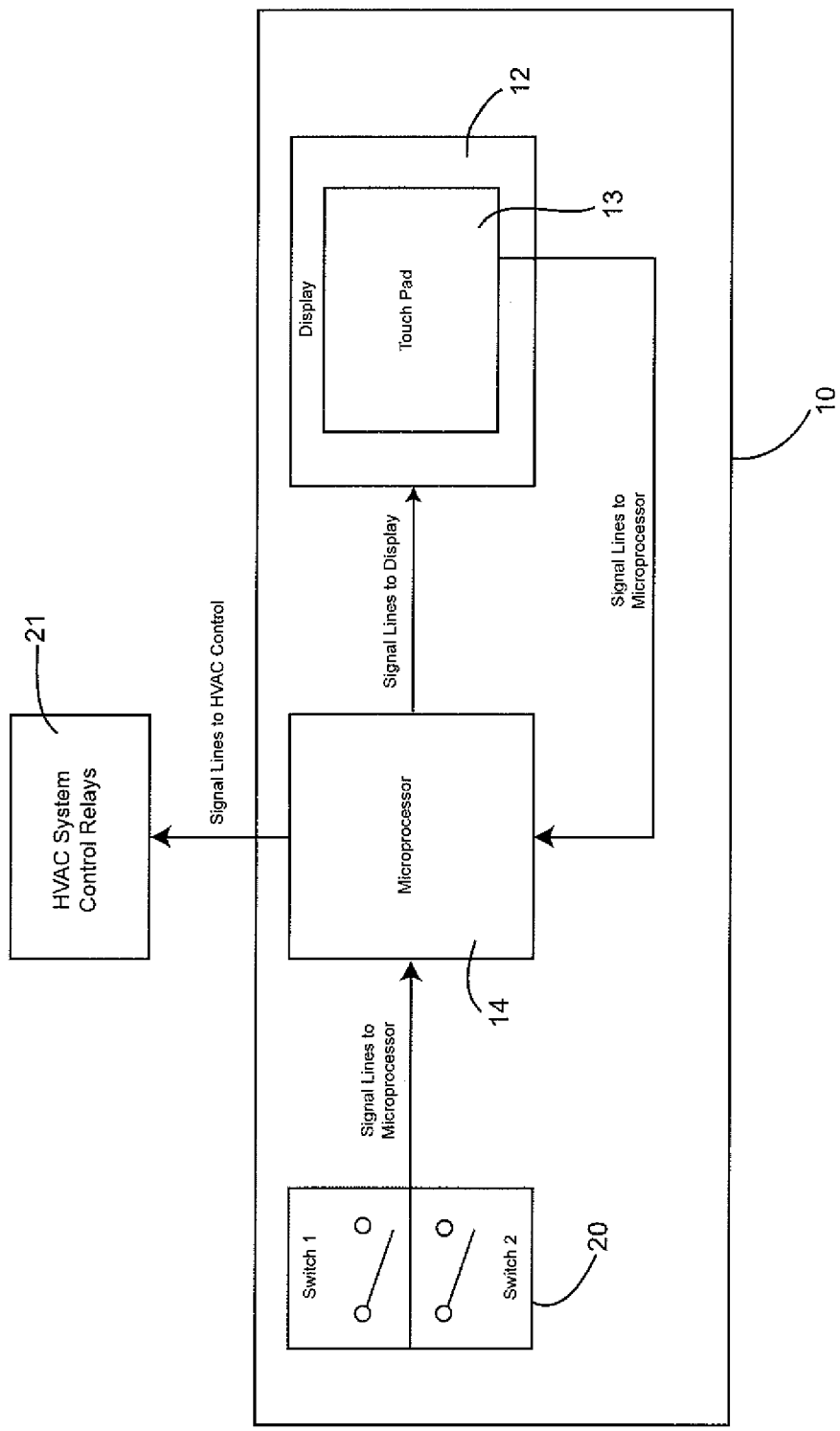
FIG. 1 is a schematic diagram of the present invention.

An embodiment of the present invention is depicted with respect to the following FIGS. 1-5, and in particular an overview of the electronic circuitry and components of the thermostat 10 of the present invention will be described with respect to FIG. 1. The thermostat 10 includes a display 12 (including touch sensitive area 13), a microprocessor 14 and switch 20. Switch 1 is provided, which may be opened and closed in order to signal the microprocessor 14 (e.g. to increment the selected set-point). As well a Switch 2, is provided which may be opened or closed to signal the microprocessor 14 (e.g. to decrement the selected set-point). The microprocessor controls the HVAC system 21 attached to the thermostat 10 and also is connected to the display 12, which allows for user input to adjust the system. For example, in a typical HVAC system 21, the thermostat 10 would be used to adjust the heating or cooling of the system in order to provide a comfortable environment for the occupants. The microprocessor 14 includes ROM which may have software loaded into it, in order to control the thermostat 10 and to provide for the display screen functionality. The display screen 12 includes displayable touch sensitive areas (see FIG. 2). As will be discussed in greater detail below, the combination of the actuation of Switch 1 and Switch 2 (via the rocker switch 20) and the touch sensitive areas 13 on the display screen 12 allow the microprocessor 14 to monitor and control the air handler HVAC system 21 or any other system to which the thermostat 10 is connected.

Figure 2:
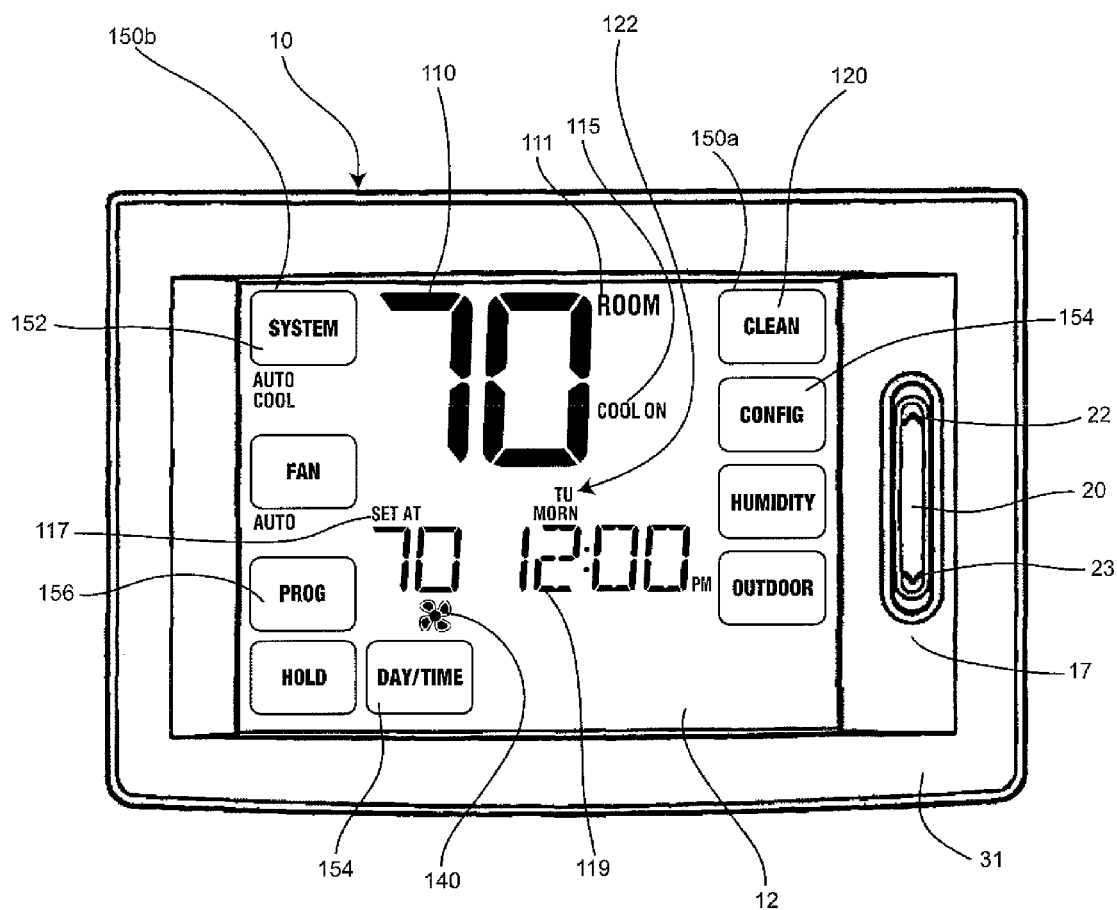
FIG. 2 is a plan view of a thermostat of the present invention.

The physical construction of the invention is described with respect to FIG. 2 as follows. A thermostat 10 or controller includes a display screen 12 and a printed circuit board mounted within a housing. A rocker switch (mechanical button) 20 is formed of a longitudinal bar having a first end 22 and a second end 23. The thermostat 10 includes a front face. The rocker switch 20 is mounted so that the switch button is exposed in the front face 17 and may be easily operated by a user. As shown in FIG. 2, the thermostat 10 is oriented so that the first end 22 of the rocker switch 20 is oriented at the upper portion of the thermostat 10 and the second end 23 of the rocker switch 20 is located toward the lower portion of the thermostat. In this orientation, the rocker switch 20 may provide for the first end 22 to act as the "up" incrementation or adjustment of a set point and the second end 23 indicates "down" decrementation or adjustment of a set point. The rocker switch 20 may also adjust modes of the thermostat 10 by rocking the switch to the "up" position by depressing the first end 22 or "down" position by depressing the second end 23. A housing 31 supports the rocker switch 20 and display 12.

Figure 3:
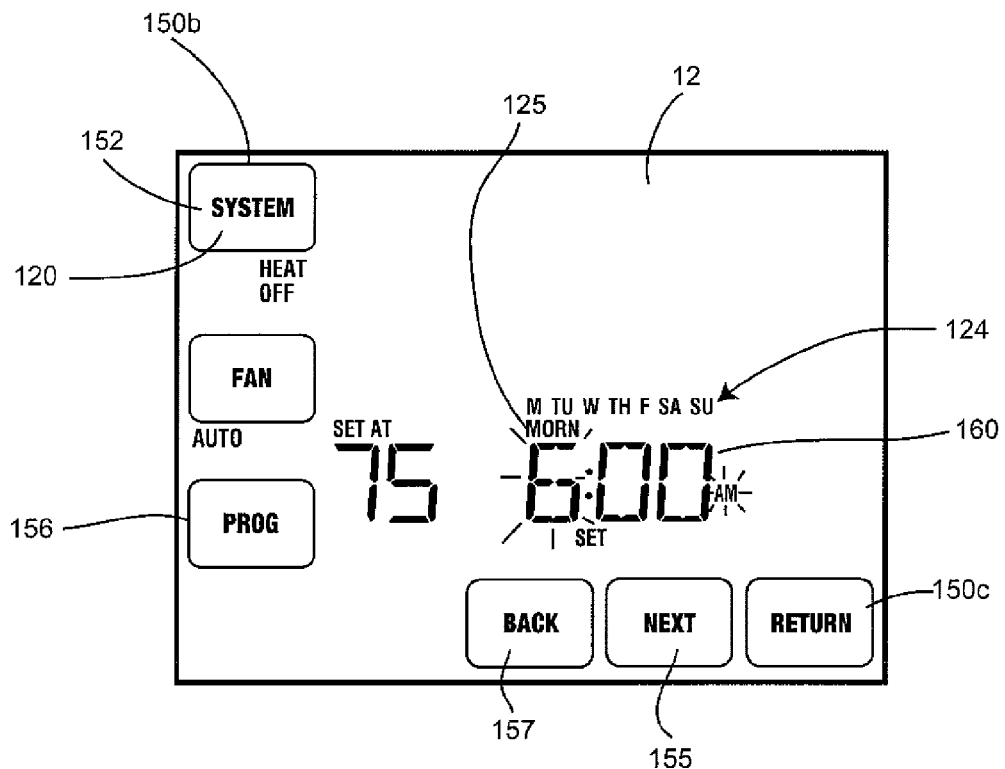
FIGS. 3-4 are diagrammatic views of the display screen illustrating examples of operation of the present invention.
Figure 4:
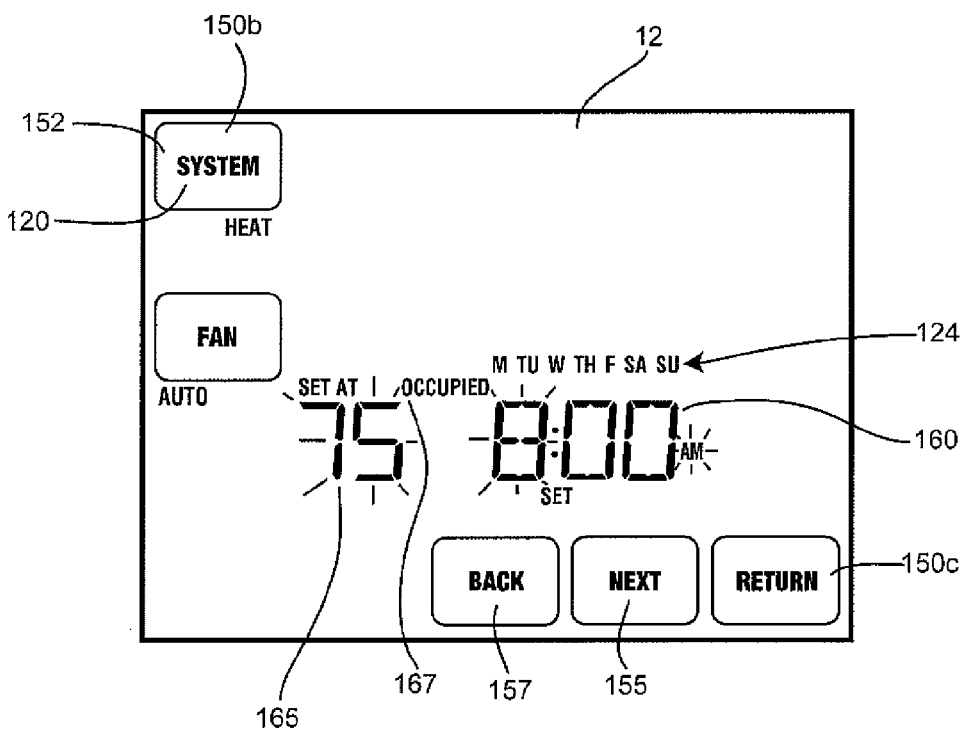

Turning to FIGS. 2-4, the standard operations of the thermostat will be described in further detail. FIG. 2 depicts the thermostat 10 including the display screen 12 having multiple icons displayed thereon. The display includes numeric icons 110, alpha-numeric icons 120 and graphical icon 140. Also included on the display, are touch sensitive (input control) areas 150a, 150b, 150c (FIG. 3, 4). In the embodiment displayed in FIG. 2, the numeric icon "70" 110 is an indication of the current room temperature and is indicated as such by the "ROOM" icon 110. As well, an alpha-numeric icon is indicating that the HVAC cooling system is running as indicated by the "COOL ON" icon 115. Other numeric icons 110 are displayed including "70" which is displayed below the alpha-numeric icon "SET AT" 117; so "70" is the set point at which the thermostat is set to trigger the HVAC system. Numeric icon "12:00" (119) indicates a set point at which the temperature should be at 70 degrees. According to the alpha-numeric icon "TU MORN" 122 indicating that on Tuesday mornings at 12:00 p.m., the set point should be 70 degrees Fahrenheit. The display of the "TU MORN" icon 122 indicates that a single/day programming mode has been selected by depressing the "SYSTEM" touch sensitive area 152 for less than three seconds.

The graphical icon 140 in this embodiment is a representative pictorial of a fan blade and indicates that the fan mode is on and running. Other types of graphical icons may be provided on the display 12.

Other alpha-numeric icons 120 are included within touch sensitive area 150a, 150b. For example, as depicted on the display 12 in the embodiment of FIG. 2, the touch sensitive area 150a, 150b that are provided and designated with alpha-numeric icons 120 are "CLEAN" "CONFIG" "HUMIDITY" "OUTDOOR" "SYSTEM" "FAN" "PROG" (PROGRAM) "HOLD" "DAY/TIME". In the embodiment depicted in FIG. 2, the touch sensitive area 150a, 150b are designated by rectangular outlines provided the display screen 12. In an alternate embodiment, the display screen 12 may have no touch sensitive areas and may function solely to display alpha-numeric 120, graphical 140, and numeric icons 110. In such an alternate embodiment the housing may include the rocker switch 20 and other mechanical buttons to operate the thermostat. For example, a first mechanical button for the menu or system function and a second mechanical button for the program function may be provided adjacent the rocker switch 20.

As depicted in FIG. 2, coincident with the touch sensitive area 150a, 150b displayed on the display screen 12, are sensing areas provided by a touch sensitive area above the display screen 12. For example, in the display for the touch sensitive area on the right side of the display screen 12 (including "CLEAN" "CONFIG" "HUMIDITY" "OUTDOOR" forming a row of four icon touch sensitive area 50a, 150b), a single long touch activation area on the touch membrane above the screen layer 12 will be provided. Likewise, on the left side of the display screen 12, an "L" shape touch sensitive area on the membrane below the touch screen layer 12 will be provided over the touch sensitive area 150a, 150b on the display screen 12 (coinciding with the "SYSTEM" "FAN" "PROG" "HOLD" AND "DAY/TIME" icons). Thus in the embodiment described above, it may be understood that there is no touch sensing capabilities in the center of the display screen 12, where the numeric icons 110 for the current room temperature set point, or time set point are displayed. In the embodiment, depicted in FIG. 2 the alpha-numeric icons 120 provided in each of the touch sensitive area 150a, 150b are modes of operation for the thermostat 10. Generally speaking, the modes of operation may be activated by touching the display screen 12 associated with the particular mode, as identified by the alpha-numeric icons 120. For example, the action of the user's finger applied to the display screen 12 at the area identified by the alpha-numeric icon "CLEAN" 120 bounded by the rectangle indicating the touch sensitive area 150a will activate the "CLEAN" mode and allow for setting of the filter cleaning mode or reminder.

In an embodiment, the touch sense regions of the touch sensitive membrane below the touch sensitive area 150b for "SYSTEM" and "FAN" will not be touch reactive. For example, when the "SYSTEM" touch sensitive area 150b is pressed, the "AUTO" alpha-numeric icon will be highlighted or made bold to indicate that the automatic feature of the system has been activated. Likewise, when the "SYSTEM" touch region 150b is pressed a second time by a user's finger, the alpha-numeric icon 120 "COOL" will be displayed as being activated. Such activation may be indicated by making the "COOL" alpha-numeric icons 120 bold. However, in this embodiment, neither the "AUTO" or "COOL" area of the display screen 12 is touch sensitive. Similarly, the area where the "AUTO" alpha-numeric icon 120 is displayed below the "FAN" touch area 150b is not touch sensitive.

The initial setting of the thermostat 10 involves configuration of installer settings in the embodiment disclosed in FIG. 2. The installer settings are selected by pressing the "SYSTEM" button 152 and "CONFIG" button 154 simultaneously. By holding down the buttons, 152, 154 simultaneously for three seconds the installer settings mode will be activated. It is noted that the term "button" refers to the combination of the alpha-numeric icon (for example, "SYSTEM") and the touch sensitive area 150 designated by the rectangular outline of the pad. "Soft" button refers to those buttons located on the touch screen display 12 and "HARD" button refers to a button separate from the touch screen display (i.e. the rocker switch 20).

Figure 5:
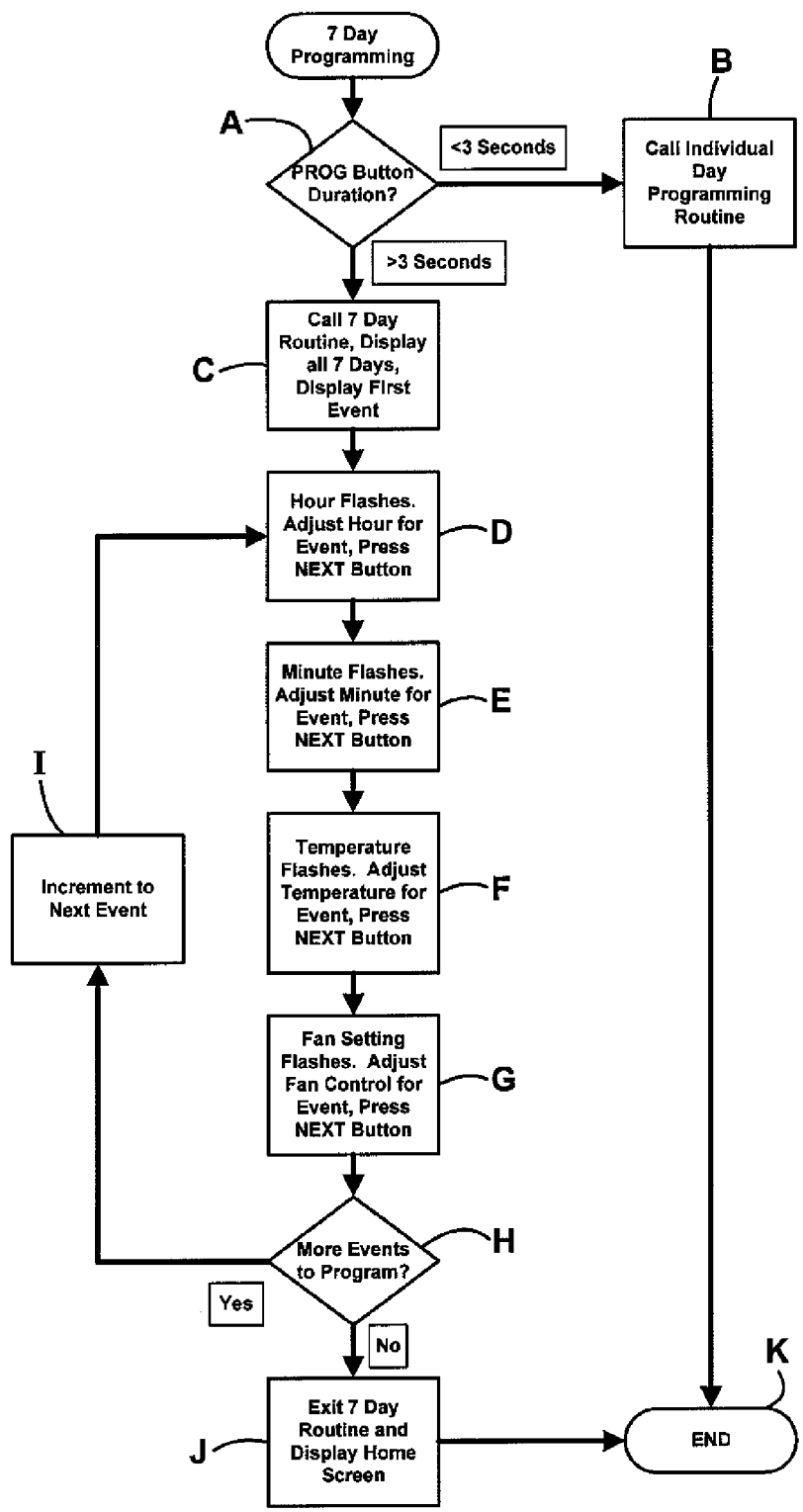
FIG. 5 is flow diagram of the present invention.

Turning to FIGS. 3-5, the operation of the seven-day/whole week programming functionality of the present invention will be described. The flow chart of FIG. 5 indicates the steps A-K followed by the thermostat 10 and the displays for such corresponding operations are depicted in FIGS. 3 and 4. Step A requires the user to activate the "PROG" touch sensitive area 156 in order to select the individual day programming mode or the seven day programming mode. The system is programmed to include a pre-determined time trigger with respect to the duration that the program button 156 is depressed. In an embodiment, the predetermined time trigger is set for 3 seconds. If the program button is depressed for less than 3 seconds. Step B is triggered and there is a call for the individual day programming routine and the individual day icon 122 (as shown in FIG. 2) will appear on the display 12, so that the user may program the time and temperature set points as the display is incremented day by day. As discussed above, the individual day programming mode will be more time consuming than the seven day programming mode. However, if each day of the week requires different set points, then the user may prefer to implement the individual day programming mode Step B. If for each day of the week the user must determine and input set points for each day using the "DAY/TIME" button 154 and adjusting the hour, minute, temperature and fan settings, the number of decisions the consumer must consider could require more than one hundred inputs. In order to avoid such lengthy programming time, the present invention provides for the seven day programming mode Step C.

When the "PROG" touch sensitive area 156 is depressed for a duration longer than the predetermined time (e.g. 3 seconds), a call is made to initiate the seven day programming mode (Step C). Once the user selects the seven day programming mode, the seven day programming mode icon 124 will be displayed on the display 12. In the embodiment depicted in FIG. 3, the seven day programming icon 124 is "M TU W TH F SA SU", which indicates each of the seven days of the week simultaneously. Other seven day programming icons may be provided such as a "7 DAY" or calendar icon. Therefore, when the seven day programming mode icon 124 is displayed the user will understand that he or she is programming the time and temperature set points for each of the seven days of the week simultaneously. In an embodiment, the user may program all of the morning times simultaneously when the "MORN" icon 125 is displayed. Other icons such as "DAY", "EVE", and "NIGHT" will be displayed in order to allow for rapid programming by a fractional period such as the daytime, evening or night periods. A first event is selected by touching the "SYSTEM" button 152 to select "HEAT" mode (for winter) or "COOL" mode (for summer).

In a commercial programming mode, the time and temperature set points may be adjusted for a fractional period such as an "OCCUPIED" or "UNOCCUPIED" period. Following selection of the "HEAT" or "COOL" mode, the "OCCUPIED" period/event time and temperature can be programmed and the "OCCUPIED" icon 167 can be programmed and the "OCCUPIED" icon will be displayed (FIG. 4). Thereafter, the "UNOCCUPIED" period/event may be programmed and an "UNOCCUPIED" icon can be displayed.

The microprocessor 14 advances the display logic to Step D, which provides for the alpha-numeric icon 160 indicating the set point for the time of day. The alpha-numeric icon 160 will flash (e.g. on and off, or lighter and darker) to identify for the user that the time of day may be adjusted. As depicted in FIG. 3, the alpha-numeric icon 160 is a display of the time "6:00" "a.m." and the numeral "6" is flashing along with the "a.m." flashing to indicate that the user may adjust the hour set-point. In an embodiment, the set point for the time may be adjusted by pressing the rocker switch 20 (FIG. 2). Once the user is satisfied with the set point for the time as indicated by the alpha-numeric icon 160, the user will press the "NEXT" touch sensitive area 155. In an embodiment, the "PROG" button 156 will disappear once the seven day programming (Step D) begins (as shown in FIG. 4).

Step E is initiated by flashing the minute icon 160 (e.g. "00"). In an embodiment, the minutes may be adjusted in ten minute increments by depressing the rocker switch 20 (FIG. 2). When the "NEXT" touch sensitive area 155 is pressed the selected item will stop flashing. After the minutes are set to the appropriate time setting the user will press the "NEXT" touch sensitive area 155 to advance to the next step. Pressing the "BACK" touch sensitive area 157 will allow for navigation backwards. In an embodiment, the system will return to home or normal mode if no button is pressed for 30 seconds.

Step F is implemented by the flashing of the temperature alpha-numeric icon 165, as shown in FIG. 4. The flashing of the temperature icon 165 demonstrates to the user that he or she may program the set point for the temperature for each of the seven days. In an embodiment, the temperature may be adjusted in 1° F. or 0.5° C. increments by pressing the rocker switch 20 (FIG. 2). As depicted in FIG. 4, the temperature is indicated as "75" or 75 degrees Fahrenheit (Celsius mode may also be provided).

Once the set point for the temperature is appropriate, the user may press the "NEXT" touch sensitive area 155 to move to Step G in order to adjust the fan setting. As discussed above, the "FAN" icon may flash or provide some other type of icon indicating that that icon may be adjusted via the pressing of buttons on the thermostat 10. After the fan setting is adjusted, the user presses the "NEXT" touch sensitive area 155 to advance to the next step in the sequence.

At Step H, the system determines whether more events need to be programmed. For example, if the user has just completed setting for the "MORN" period, the next event may be to set the "DAY" period. Then the sequence of steps to adjust the hour will begin again at Step D, subsequently followed by the adjustment of the set points at Steps E-G. Again at Step H, the system will determine if there are any more events to program.

If there are no more events to program the next step is to exit the seven day programming mode at Step J by completing a 30 second timeout, or by pressing the "RETURN" button 150c, which will cause the home screen to be displayed. For example, the display 12 as depicted in FIG. 2 may be displayed. Then at Step K, the programming has ended and the user may allow the thermostat to run automatically according to the set points inputted. Thus it can be understood that in less than twenty steps via use of the seven day programming mode, the entire week worth of set points can be programmed into the thermostat. This programming can be undertaken without requiring an increment from a first day to a second day etc. (such as required during the individual day programming mode). In an embodiment, the system may provide for a five day programming mode (e.g. a 5-2 day residential or commercial mode for Monday-Friday using one 4 event schedule and Saturday and Sunday programmed with a different 4 event schedule).

While various concepts have been described in detail, it would be appreciated by those skilled in the art that various modifications and alternatives to those concepts could be developed in light of the overall teachings of the disclosure. Therefore, a person skilled in the art, applying ordinary skill, will be able to practice the invention set forth in the claims without undue experimentation. It will additionally be appreciated that the particular concepts exposed herein are meant to be illustrative only and not limiting to the scope of the invention, which is to be given the full breath of the appended claims and any equivalents thereof.

What is claimed is:

1. A method for programming a thermostat comprising the steps of:
   providing a thermostat having a display and buttons for controlling at least two modes of the thermostat including a heating mode and a cooling mode and the thermostat capable of controlling the heating and cooling conditioning modes for every day of the week;
   activating a first programming mode, wherein such activating occurs by depressing a programming mode button for a first preselected duration in order to select a first day for setting the conditioning mode;
   activating a second programming mode, wherein such activating occurs by depressing the programming mode button for a second preselected duration that is longer than the first preselected duration in order to select programming for all seven days for setting the cooling mode for all seven days simultaneously; and
   displaying a seven day icon on the display during the conditioning mode selection.

2. The method of claim 1 wherein:
the buttons are mechanical buttons disposed on a housing of the thermostat.

3. The method of claim 1 wherein:
the buttons are touch sensitive areas displayed on a display screen of the thermostat.

4. The method of claim 1 wherein:
the buttons are a combination of a mechanical button and touch sensitive area button.

5. The method of claim 4 wherein:
the mechanical button is a rocker switch.

6. The method of claim 1 further comprising the step of:
selecting the temperature and duration of a fractional day period including one of a morning period, a daytime period, an evening period, a night period, or an occupied period or an unoccupied period.

7. The method of claim 1 further comprising the step of:
selecting a fan setting.

8. The method of claim 1 wherein the first programming mode is activated by depressing a program button and the program button includes a predetermined time trigger of 3.0 seconds so that pressing the program button for a period of time greater than 3.0 seconds results in activation of a seven day programming mode and pressing the program button for a period of time less than 3.0 seconds results in activation of an individual day programming mode.

9. The method of claim 1 wherein the system button and program button are touch sensitive areas on the display screen of the thermostat.

10. The method of claim 1 wherein the seven day programming is for setting one of the heating and the cooling modes.

11. A method for programming a thermostat comprising the steps of:
   providing a thermostat having a display and buttons for controlling at least two modes of the thermostat and the thermostat capable of controlling the heating and cooling conditioning modes for every day of the week;
   activating a first programming mode button having a first pre-selected duration trigger in order to select a first day for setting the conditioning mode;
   activating a second programming mode button having a second pre-selected duration trigger that is longer than the first pre-selected duration trigger in order to select programming for all seven days simultaneously.

12. The method of claim 11 wherein:
the buttons are mechanical buttons disposed on a housing of the thermostat.

13. The method of claim 11 wherein:
the buttons are touch sensitive areas displayed on a display screen of the thermostat.

14. The method of claim 11 wherein:
the buttons are a combination of a mechanical button and a touch sensitive area button.

15. The method of claim 11 wherein:
the mechanical button is a rocker switch.

16. The method of claim 11 further comprising the step of:
selecting the temperature and duration of a fractional day period including one of a morning period, a daytime period, an evening period, a night period, or an occupied period or an unoccupied period.

17. The method of claim 11, wherein the conditioning mode includes selection of one of a heating mode, cooling mode, on period, off period, fan period and fan recirculation period.

* * * * *